United States Patent
Huang et al.

(10) Patent No.: US 10,649,514 B2
(45) Date of Patent: May 12, 2020

(54) METHOD AND APPARATUS FOR TEMPERATURE AND VOLTAGE MANAGEMENT CONTROL

(71) Applicant: Advanced Micro Devices, Inc., Sunnyvale, CA (US)

(72) Inventors: Wei Huang, Austin, TX (US); Yazhou Zu, Austin, TX (US); Indrani Paul, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 601 days.

(21) Appl. No.: 15/274,697

(22) Filed: Sep. 23, 2016

(65) Prior Publication Data

US 2018/0088606 A1 Mar. 29, 2018

(51) Int. Cl.
*G06F 1/00* (2006.01)
*G06F 1/28* (2006.01)

(52) U.S. Cl.
CPC .................... *G06F 1/28* (2013.01)

(58) Field of Classification Search
CPC ......... G06F 1/28; G06F 1/3296; G06F 1/3206
See application file for complete search history.

(56) References Cited

U.S. PATENT DOCUMENTS 7,917,772 B1 * 3/2011 Koniaris ............... G06F 1/3203
                                                713/300
9,383,760 B2 7/2016 Porras et al.
2013/0083825 A1 4/2013 Zhang et al.
2015/0091638 A1 4/2015 Shiozaki et al.
2015/0241955 A1 * 8/2015 Kosonocky ........... G06F 1/3296
                                                713/320

(Continued)

FOREIGN PATENT DOCUMENTS

WO 2010-151754 A2 12/2010
WO 2016-013983 A1 1/2016

OTHER PUBLICATIONS

Sundaram, Sriram et al.; Adaptive Voltage Frequency Scaling using Critical Path Accumulator implemented in 28nm CPU; 2016 29th International Conference on VLSI Design and 2016 15th International Conference on Embedded Systems; 2016.

(Continued)

*Primary Examiner* — Xuxing Chen
(74) *Attorney, Agent, or Firm* — Faegre Baker Daniels LLP

(57) ABSTRACT

A method and apparatus for managing processing power determine a supply voltage to supply to a processing unit, such as a central processing unit (CPU) or graphics processing unit (GPU), based on temperature inversion based voltage, frequency, temperature (VFT) data. The temperature inversion based VFT data includes supply voltages and corresponding operating temperatures that cause the processing unit's transistors to operate in a temperature inversion region. In one example, the temperature inversion based VFT data includes lower supply voltages and corresponding higher temperatures in a temperature inversion region of a processing unit. The temperature inversion based VFT data is based on an operating frequency of the processing unit. The apparatus and method adjust a supply voltage to the processing unit based on the temperature inversion based VFT data.

25 Claims, 11 Drawing Sheets

(56) References Cited

U.S. PATENT DOCUMENTS

2016/0179164 A1* 6/2016 Park .................. G06F 1/324
713/322

OTHER PUBLICATIONS

Hoffmann, Henry et al.; Dynamic Knobs for Responsive Power-Aware Computing; Proceedings of the 16th International Conference on Architectural Support for Programming Languages and Operating Systems; Mar. 5-11, 2011.
Vekataramani, Swagath et al.; Quality Programmable Vector Processors for Approximate Computing; Proceedings of the 46th Annual IEEE/ACM International Symposium on Microarchitecture; 2013.
Korean Intellectual Property Office; International Search Report and Written Opinion; International Application No. PCT/US2017/052677; dated Jan. 11, 2018.

* cited by examiner

| $f_n$ | 20°C | 40°C | 60°C | 80°C | 100°C |
|---|---|---|---|---|---|
| 693.75 mV | 3.7% | - | - | - | - |
| 687.50 mV | 2.2% | 506 - | - | - | - |
| 681.25 mV | 8.4% | 2.3% | 506 - | - | - |
| 675.00 mV | 13.9% | 5.3% | 4.9% | 506 - | - |
| 668.75 mV | - | 9.5% | 2.5% | 1.9% | 506 - |
| 662.50 mV | - | 13.5% | 6.5% | 5.6% | 9.9% |
| 656.25 mV | - | - | 12.2% | 9.3% | 5.1% |
| 650.00 mV | - | - | - | - | - |

TIMING ERROR COMPARED TO THE REFERENCE SETTING FOR DIFFERENT <TEMPERATURE, VOLTAGE> CONFIGURATIONS

FIG. 5

| | $f_n$ | | | | |
|---|---|---|---|---|---|
| 504 | 20 | 40 | 60 | 80 | 100 |
| 602 | 687.50mV | 681.25mV | 668.75mV | 662.50mV | 650.00mV |

FIG. 6

METHOD AND APPARATUS FOR TEMPERATURE AND VOLTAGE MANAGEMENT CONTROL

GOVERNMENT LICENSE RIGHTS

This invention was made with government support under Prime Contract Number DE-AC52-07NA27344, Subcontract No. B609201 awarded by the Department of Energy (DOE). The government has certain rights in the invention.

BACKGROUND OF THE DISCLOSURE

Processing units, such as processing cores, central processing units (CPUs), and graphic processing units (GPUs), are designed to operate within a supply voltage range. For example, a processing unit can be designed to operate within a voltage range of a nominal supply voltage, such as 5 volts. The supply voltage range can include a minimum supply voltage where, if the processing unit is supplied with a supply voltage less than the minimum supply voltage, the processing unit becomes unreliable. Processing units are also designed to operate within a temperature range where if the processing unit operates outside of the temperature range, the processing unit can become unreliable. Consequently, a processing unit is typically manufactured at a grade, such as a commercial, industrial, or military grade, where the grade represents a temperature range the processing unit is designed to operate within. For example, while a commercial graded processing unit can be designed to operate within a temperature range of 0 degrees Celsius (C) to 70 degrees C., a military graded processing unit can be designed to operate within a temperature range of −55 degrees C. to 125 degrees C.

A processing unit's dynamic power is directly related to the processing unit's supply voltage and to its operating (e.g., executing) frequency (e.g., speed). The higher a processing unit's supply voltage is, given the same operating frequency of the processor, the higher its dynamic power will be. Similarly, the higher the processing unit's operating frequency is, given the same supply voltage, the higher the processing unit's dynamic power will be. Thus, a processing unit's dynamic power increases or decreases based on its supply voltage and operating frequency.

A processing unit can also leak from the transistors making up the processing unit current causing the processing unit to lose power in the form of leakage power. The temperature a processing unit is operating at, and the supply voltage of the processing unit, are both directly related to a processing unit's leakage power. Typically, the higher a processing unit's operating temperature, given the same supply voltage, the higher the processing unit's leakage power will be. Similarly, the higher a processing unit's supply voltage, assuming the same operating temperature, the higher the processing unit's leakage power will be.

A processing unit's normalized power is based on the processing unit's dynamic power and leakage power compared to the processing unit's dynamic power and leakage power at a reference operating temperature, reference supply voltage, and reference operating frequency. For example, a processing unit's normalized power can be calculated as the addition of processing unit's dynamic power to its leakage power at a supply voltage and operating temperature divided by the addition of the processing unit's dynamic and leakage power at a reference supply voltage and reference operating temperature.

As a result of higher operating temperatures, transistors can undergo an effect known as temperature inversion where a transistor's operating speed becomes faster at the higher operating temperatures. Typically a processing unit's transistors will operate slower as their operating temperature increases. However, in the temperature inversion region of a processing unit's transistors, as the processing unit heats up (resulting in a higher operating temperature) its transistors can begin to operate at a faster rate. In addition, the processing unit's leakage power can increase, at least in part due to the higher operating temperature, thus resulting in processing power and/or speed inefficiencies. The effects of temperature inversion on a processing unit have largely been ignored because temperature inversion does not occur in typical supply voltage ranges of a processing unit. These effects, however, are becoming increasingly relevant in current and future technologies, such as in devices that employ Fin Field Effect Transistors (FinFET), which can operate with lower supply voltages than traditional transistors.

As such, there are opportunities to address temperature inversion effects on a processing unit while operating at lower supply voltages.

SUMMARY OF THE DISCLOSURE

A method and apparatus for managing processing power sets a supply voltage for a processing unit based on temperature inversion based voltage, frequency, and temperature (VFT) data. The temperature inversion based VFT data includes supply voltages associated with operating temperatures under which the transistors of the processing unit undergo a temperature inversion effect. As such, the methods and apparatus allow a processing unit to operate at lower supply voltage levels while operating at higher temperatures while still maintaining processing speeds obtained at a higher supply voltage, thereby reducing processing power inefficiencies.

For example, temperature inversion based VFT data can include a supply voltage in a supply voltage range under which the transistors of the processing unit will operate at a faster rate as their operating temperature rises. In one example, the temperature inversion based VFT data includes lower supply voltages associated with corresponding higher temperatures under which a processing unit's transistors operate in a temperature inversion region. For example, the temperature inversion based VFT data can include a first supply voltage associated with a first operating temperature, and a second supply voltage that is less than the first supply voltage and associated with a second operating temperature that is higher than the first operating temperature.

In one example, the temperature inversion based VFT data is based on the operating frequency of the processing unit. For example, the temperature inversion based VFT data can include supply voltages and corresponding operating temperatures based on various operating frequencies of the processing unit, where a particular supply voltage and corresponding operating temperature is associated with a particular operating frequency, or operating frequency range, of the processing unit. The temperature inversion based VFT data can be stored, for example, in a temperature inversion based VFT table residing in memory. In one example, the temperature inversion based VFT table is stored in on-chip memory. For example, the temperature inversion based VFT table is fused into on-chip memory. In other examples, the temperature inversion based VFT data can be the result of an executed function, such as one executed by a suitable processor, or the output of a state machine.

In one example, the apparatus can adjust the processing unit's supply voltage based on the processing unit's operating temperature and the temperature inversion based VFT data to reduce the operating power of the processing unit while maintaining at least a minimum operating speed of the processing unit such as, for example, the operating speed of the processing unit while operating at a reference operating temperature and reference supply voltage. As a result, the processing unit's power efficiency can be improved.

In one example the apparatus provides a supply voltage to the processing unit and obtains (e.g., receives) an operating (e.g., runtime) temperature of the processing unit. The apparatus determines whether the transistors of the processing unit are operating in a temperature inversion range based on the supply voltage provided to the processing unit. For example, the apparatus determines that the transistors of the processing unit are operating in a temperature inversion range if the received operating temperature of the processing unit is below a minimum threshold (e.g., 0.7 V). In one example, the apparatus determines that the operating temperature of the processing unit corresponds to an operating temperature of the temperature inversion based VFT data.

In one example the apparatus adjusts a supply voltage to the processing unit based on the temperature inversion based VFT data. For example, the temperature inversion based VFT data can indicate that, at the current operating temperature of the processing unit, the processing unit is operating at a rate greater than a rate the processing unit would operate at if the processing unit where operating at a lower temperature (e.g., a timing margin exists between the rate the processing unit is operating at while operating at the current temperature and the rate the processing unit would operate at if it were operating at the lower temperature). As such, the apparatus can lower the supply voltage to the processing unit to decrease the rate at which the processing unit is operating at.

In one example, the apparatus maintains an operating frequency of the processing unit by reducing the supply voltage to the processing unit from a first supply voltage level to a second supply voltage level. The second supply voltage level corresponds to a supply voltage obtained from the temperature inversion based VFT data. As a result, the processing unit will operate at a rate closer to (e.g., at least as fast as) a rate the processing unit would operate at if the processing unit where operating at the lower temperature, thereby reducing the processing unit's dynamic power. In one example, adjusting the supply voltage to the processing unit causes the processing unit's dynamic power to be greater than the processing unit's leakage power.

In one example, the temperature inversion based VFT data is pre-determined based on testing one or more processing unit workloads to obtain operating temperature and supply voltage mappings. For example, a processing unit can be tested for a reference processing unit operating speed by executing one or more processing unit workloads on the processing unit while the processing unit operates at a reference frequency (e.g., 300 MHz), is supplied with a reference voltage (e.g., 0.7 Volts), and operates at a reference operating temperature (e.g., 0 degrees Celsius). The reference processing unit operating speed can be a measurement of the processing unit's pipeline speed when operating at the reference frequency, supplied with the reference voltage, and operating at the reference operating temperature. Similarly, reference processing unit operating speeds at various other operating temperatures can be determined while the processing unit operates at the same reference frequency and supplied with the same reference voltage when executing the same, or similar, workloads. For example, the processing unit's operating speed is measured while the operating temperature of the processing unit is adjusted (e.g., increased or decreased). As such, reference processing unit operating speeds for the processing unit are determined for a particular reference frequency and reference supply voltage at various reference operating temperatures.

The processing unit can then be tested for processing unit operating speed by having the processing unit execute the workloads while operating at the same reference frequency and reference operating temperatures, but while supplied with different supply voltages. For example, the supply voltages can be supply voltages that cause the transistors of the processing unit to operate in a temperature inversion region.

A processing unit's timing margin at the various operating temperatures and supply voltages can be determined by comparing the processing unit's operating speeds while operating at various operating temperatures and supply voltages to a reference processing unit operating speed (i.e., operating speed while operating at a reference operating temperature while being supplied a reference supply voltage). For example, the timing margin at a particular operating temperature and supply voltage can be determined by comparing a reference processing unit operating speed to an operating speed of the processing unit associated with the processing unit being supplied with a different supply voltage (e.g., one in the temperature inversion region of the processing unit's transistors) and operating at the same particular reference temperature. In one example, the timing margin can be calculated by taking the difference of the two processing unit operating speeds. In another example, the timing margin can be calculated by taking a ratio of the two processing unit operating speeds.

The temperature inversion based VFT data can include processing unit supply voltages whose corresponding operating temperatures associated timing margin at least meet (e.g., satisfy) the reference timing margin. For example, the temperature inversion based VFT data can include a supply voltage that is less than the reference supply voltage and a corresponding operating temperature that is greater than the reference temperature.

In one example, the temperature inversion based VFT data includes supply voltages, each corresponding to an operating temperature, that are below a reference supply voltage (e.g., below a 0.7V reference supply voltage). The supply voltages of the temperature inversion based VFT data are such that, based on a reference supply voltage (e.g., 0.7 V) and a reference operating temperature (e.g., 0 degrees Celsius), the timing margin of the processing unit is less when the processing unit operates at a supply voltage of the temperature inversion based VFT data (e.g., a few tenths of a millivolt lower than the reference supply voltage) and its associated operating temperature (e.g., 80 degrees Celsius) than when the processing unit operates at the reference supply voltage (e.g., 0.7 V) and the operating temperature (e.g., 80 degrees Celsius) associated with the supply voltage of the temperature inversion based VFT data. For example, given the same operating temperature of the processing unit (e.g., 80 degrees Celsius), supplying the processing unit with the supply voltage indicated by the temperature inversion based VFT data results in the processing unit operating at a slower speed compared to the operating speed the processing unit would operate at if the processing unit were supplied with the reference supply voltage. However, the slower operating speed would be at least as fast as if the processing unit were supplied with the reference supply voltage but operating at a reference operating temperature (e.g., 0 degrees Celsius).

In one example, the temperature inversion based VFT data includes processing unit supply voltages and corresponding operating temperatures where the processing unit's dynamic power is greater than the processing unit's leakage power when the processing unit is operating at each supply voltage and corresponding operating temperature.

In one example, the apparatus determines that a previously received operating temperature of the processing unit is within a minimum range of a first operating temperature of the temperature inversion based VFT data. For example, the first operating temperature is one that is closest to a prior operating temperature of the processing unit. The apparatus also determines whether a current operating temperature is within a minimum range of a second operating temperature of the temperature inversion based VFT data. If the current operating temperature is greater than the previous operating temperature, the apparatus adjusts the supply voltage to the processing unit by reducing the supply voltage to the processing unit. For example, the apparatus can reduce the supply voltage to the processing unit from a first supply voltage that corresponds to the first temperature of the temperature inversion based VFT data, to a second supply voltage that corresponds to the second temperature of the temperature inversion based VFT data.

In another example, the apparatus determines that the current operating temperature is closer to a second operating temperature of the temperature inversion based VFT data than the first temperature corresponding to a first operating temperature of the temperature inversion based VFT data. The apparatus then reduces the supply voltage to the processing unit from the first supply voltage of the temperature inversion based VFT data to the second supply voltage of the temperature inversion based VFT data.

In one example, if the current operating temperature is less than the previous operating temperature, the apparatus adjusts the supply voltage to the processing unit by increasing the supply voltage to the processing unit. For example, the apparatus can increase the supply voltage to the processing unit from a first supply voltage of the temperature inversion based VFT data to a second supply voltage of the temperature inversion based VFT data. As such, the apparatus can increase a timing margin of the processing unit. For example, the operating speed of the processing unit at the first supply voltage and lower temperature can be less than the operating speed of the processing unit while operating at the reference supply voltage (e.g., 0.7 V) and reference operating temperature (e.g., 0 degrees Celsius). By increasing the supply voltage to the second supply voltage of the temperature inversion based VFT data, the operating speed of the processing unit is increased to be closer to the operating speed of the processing unit while operating at the reference supply voltage and reference operating temperature. As such, the timing margin of the processing unit is reduced.

In one example, the apparatus determines the processing unit's dynamic power based on a current supply voltage and operating (e.g., execution) frequency of the processing unit. The apparatus also determines the processing unit's leakage power based on the current supply voltage and current operating frequency of the processing unit. The apparatus provides a cooling control signal, such as to a fan, to regulate the temperature of the processing unit based on the processing unit's determined dynamic power and leakage power. In one example, the apparatus adjusts the cooling control signal so as to enable the processing unit to reach an optimal temperature, as described further below.

For example, given a constant supply voltage, a processing unit's overall processing power can be greater at higher temperatures due to increased leakage power. However, by reducing the supply voltage, the processing unit's overall processing power can be reduced, due to the processing unit's reduced dynamic power. A processing unit's optimal temperature, therefore, can include operating temperatures where a processing unit's normalized power (e.g., addition of processing unit's dynamic power to its leakage power at a supply voltage and operating temperature divided by the addition of the processing unit's dynamic and leakage power at a reference supply voltage and reference operating temperature) is at a minimum. The optimal temperature can also be dependent on the type of processing unit (e.g., model, package type), and a workload (e.g., type of workload) of the processing unit, as explained further below.

In one example, the temperature inversion based VFT data includes preferred operating temperatures, such as operating temperatures where a processing unit's normalized power is at a minimum when operating at a particular operating temperature and supply voltage. If the processing unit's current operating temperature is higher than a preferred operating temperature, the apparatus causes a fan to turn on to cool the processing unit. Similarly, if the processing unit's current operating temperature is lower than a preferred operating temperature, the apparatus causes a fan to turn off so as not to cool the processing unit.

Corresponding methods are also contemplated.

BRIEF DESCRIPTION OF THE DRAWINGS

The disclosure will be more readily understood in view of the following description when accompanied by the below figures and wherein like reference numerals represent like elements, wherein:

FIG. 5 is a temperature inversion based VFT timing error table illustrating a processing unit timing analysis at various processing unit supply voltages and operating temperatures in accordance with one example set forth in the disclosure;

FIG. 6 is a temperature inversion based VFT data table illustrating temperature inversion based VFT data in accordance with one example set forth in the disclosure;

DETAILED DESCRIPTION OF EMBODIMENTS

Exemplary embodiments provide for managing processing power by determining a supply voltage to supply to a processing unit, such as a CPU or GPU, based on temperature inversion based VFT data. The temperature inversion based VFT data can include processing unit supply voltages and associated (e.g., corresponding) operating temperatures that result in a processing unit's transistors operating in a temperature inversion region. As such, one or more of the embodiments allow a processing unit to operate with lower dynamic power at higher operating temperatures while still maintaining processing operating speeds obtained at a reference supply voltage and reference operating temperature.

Figure 1:
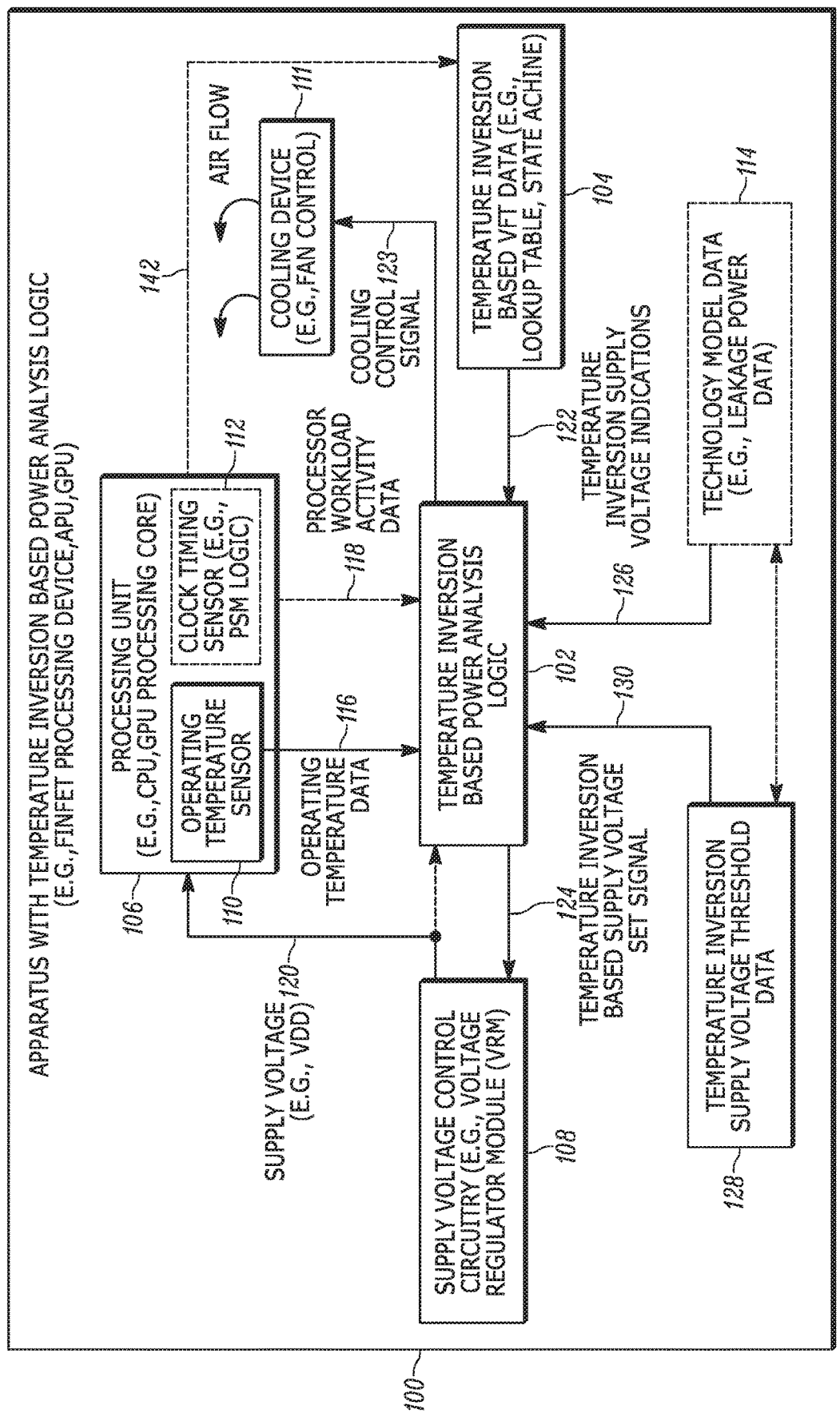
FIG. 1 is a block diagram illustrating an apparatus including temperature inversion based power analysis logic in accordance with one example set forth in the disclosure.

Turning to the drawings, FIG. 1 is a block diagram illustrating example apparatus 100 employing temperature inversion based power analysis logic 102 and temperature inversion based VFT data 104. The apparatus 100 can be an integrated circuit (IC), a device such as a home media server, smart phone, tablet, other handheld computing device, laptop computer, desktop computer, set-top box, a wearable device, Internet server, or any suitable device. Although any suitable structure can be used, in this example the apparatus 100 includes processing unit 106 which can be a FinFET processing device, a CPU, a GPU, an Accelerated Processing Unit (APU), a processing core, a microcontroller, or any other suitable processing unit. Processing unit 106 can also include an operating temperature sensor 110, and can optionally include a clock timing sensor 112. Operating temperature sensor 110 is operable to determine an operating temperature of processing unit 106 and provide sensed operating temperature data 116, and, in one example, is mounted on top of processing unit 106. Clock timing sensor 112 is operable to provide processing unit workload activity data 118, further described below.

In this example, temperature inversion based power analysis logic 102 is operably coupled to processing unit 106 and receives sensed operating temperature data 116, such as the current operating temperature of the processing unit 106, from processing unit 106. Temperature inversion based power analysis logic 102 obtains (e.g., reads) temperature inversion supply voltage indication 122 from temperature inversion based VFT data 104 to determine a supply voltage to provide to processing unit 106. For example, temperature inversion based power analysis logic 102 obtains the current operating temperature of processing unit 106, and receives a temperature inversion supply voltage indication 122 including a supply voltage corresponding to an operating temperature closest to the obtained current operating temperature of processing unit 106, to determine a supply voltage to provide to processing unit 106.

Temperature inversion based VFT data 104 can reside, for example, in a memory device as a temperature inversion based VFT table and include one or more entries. For example, temperature inversion based power analysis logic 102 can receive temperature inversion supply voltage indication 122 from temperature inversion based VFT data 104 to determine a supply voltage from the temperature inversion based VFT data 104 associated with the closest operating temperature to a current operating temperature of processing unit 106. Processing unit 106 can optionally be operably coupled to temperature inversion based VFT data 104 over communication bus 142. In one example, processing unit 106 provides processing unit supply voltages and associated operating temperatures to temperature inversion based VFT data 104.

Temperature inversion based power analysis logic 102 is also operably coupled to supply voltage control circuitry 108, which provides a supply voltage to processing unit 106. For example, supply voltage control circuitry 108 can include a voltage regulator module to supply voltage to processing unit 106. Temperature inversion based power analysis logic 102 sets the supply voltage 120 via the supply voltage control circuitry 108 by providing a temperature inversion based supply voltage set signal 124. For example, temperature inversion based power analysis logic 102 can set the supply voltage 120 based on a supply voltage associated with a temperature inversion supply voltage indication 122 obtained from temperature inversion based VFT data 104.

Temperature inversion based power analysis logic 102 is also operably coupled to temperature inversion supply voltage threshold data 128, which provides a temperature inversion supply voltage threshold 130. The temperature inversion supply voltage threshold 130 is supply voltage threshold (e.g., 0.7 V) under which the transistors to processing unit 106 operate in a temperature inversion region. Temperature inversion supply voltage threshold data 128 can include one or more temperature inversion supply voltage thresholds 130 for one or more types (e.g., models) of processing units, such as processing unit 106. For example, temperature inversion supply voltage threshold data 128 can include the package type of processing unit 106 (e.g., 90 nm, 66 nm, 45 nm, etc.).

Temperature inversion based power analysis logic 102 is also operably coupled to cooling device 111 which, in one example, is a fan control. Cooling device 111 is operable to cool down processing unit 106 such as by providing air flow to processing unit 106. Temperature inversion based power analysis logic 102 controls the amount of cooling provided by cooling device 111 via cooling control signal 123. For example, temperature inversion based power analysis logic 102 can signal cooling device 111 to turn on, turn off, or adjust the amount of cooling provided.

Temperature inversion based power analysis logic 102 receives processing unit workload activity data 118 from the optional clock timing sensor 112 of processing unit 106. Processor workload activity data 118 can include, for example, a current workload level for processing unit 106. Temperature inversion based power analysis logic 102 determines an average workload activity for processing unit 106 over a period of time based on processor workload activity data 118. The processor workload activity data 118 can include timing data to allow temperature inversion based power analysis logic 102 to measure processing unit's 106 operating speed when its transistors are operating in a temperature inversion region. In one example, clock timing sensor 112 is a power supply monitor (PSM) that allows for the measurement of operating speeds of circuits within processing unit 106. The PSM can include a time-to-digital converter that reflects circuit time-delay or speed in numeric form.

Temperature inversion based power analysis logic 102 can optionally be operably coupled over communication bus 126 to technology model data 114 and can obtain specific and/or identifying information related to processing unit 106 such as leakage power data. Leakage power data can include scaling factors that can be used in an algorithm computation to calculate the processing unit's leakage power, as described further below with respect to FIG. 3.

Communication paths interconnecting the various components in FIG. 1 can be implemented using any suitable buses and protocols, such as PCI (Peripheral Component Interconnect), PCI-Express, AGP (Accelerated Graphics Port), HyperTransport, or any other bus or point-to-point communication protocol(s), and connections between different devices can use different protocols as is known in the art.

Figure 2:
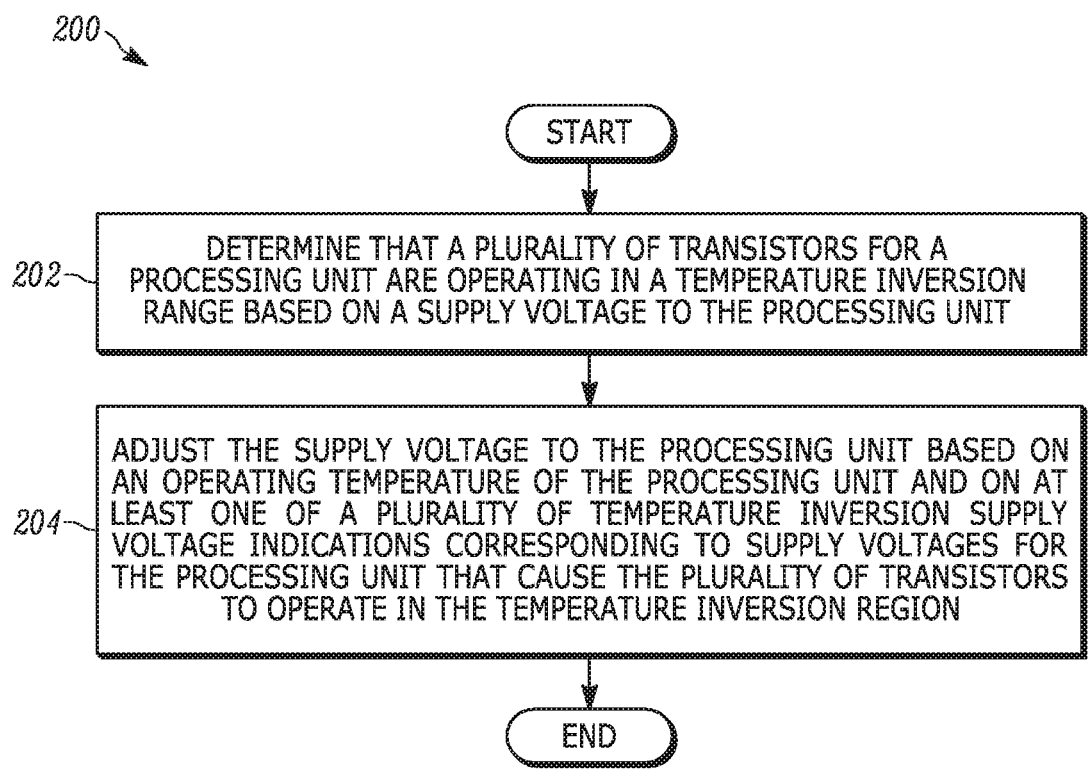
FIG. 2 is a flow chart illustrating a method for controlling a supply voltage to a processing unit in accordance with one example set forth in the disclosure.

FIG. 2 illustrates a flow chart of an example method 200 for controlling a supply voltage to a processing unit that can be performed, for example, by temperature inversion based power analysis logic 102. In this example, at step 202, a determination is made that a plurality of transistors for a processing unit, such as processing unit 106, are operating in a temperature inversion range based on a supply voltage, such as supply voltage 120, to the processing unit. At step 204, the supply voltage to the processing unit is adjusted based on an operating temperature of the processing unit and on at least one temperature inversion supply voltage indication, such as temperature supply voltage indication 122, that corresponds to a supply voltage for the processing unit that causes its transistors to operate in the temperature inversion region.

Figure 3:
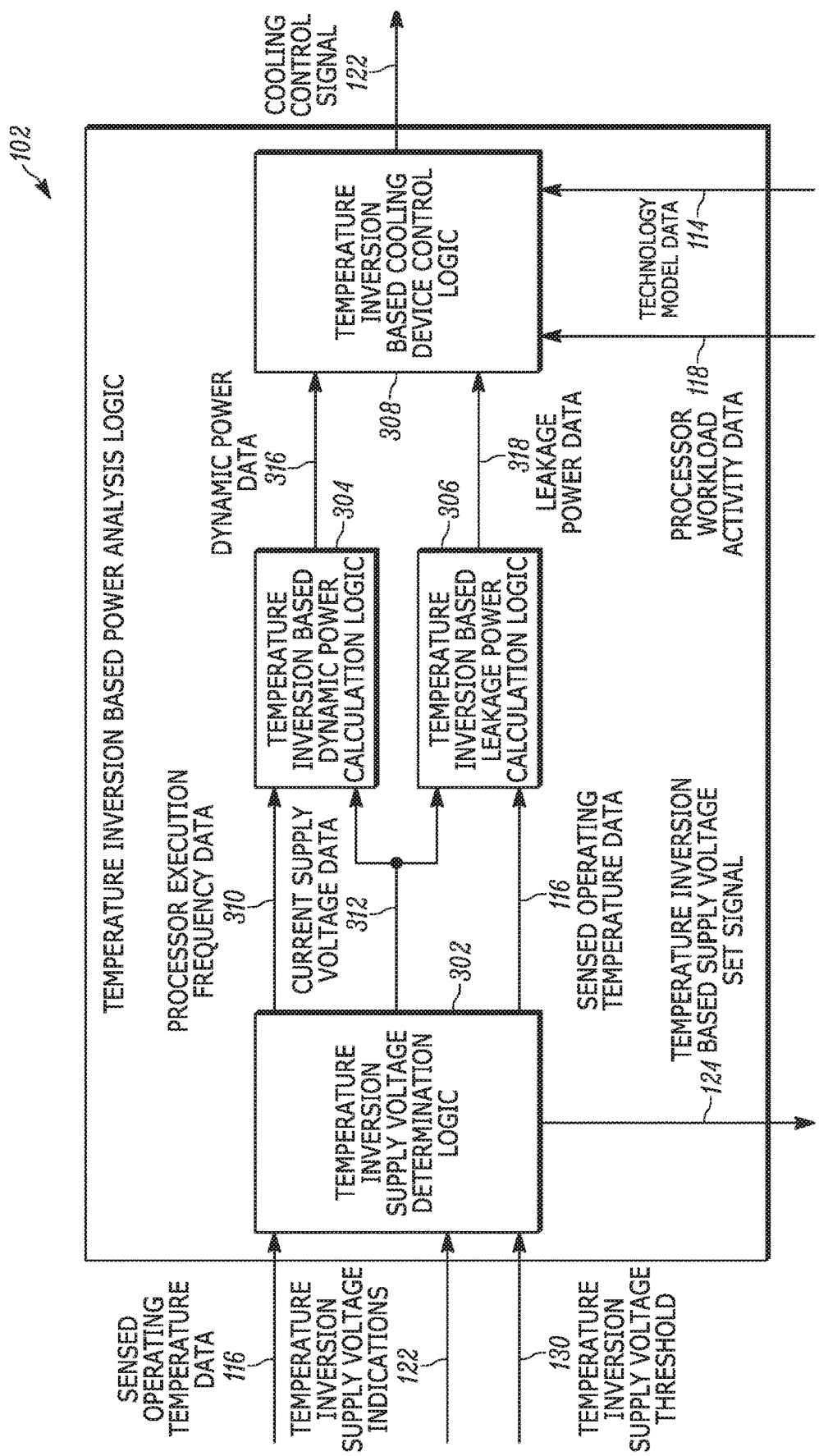
FIG. 3 is a block diagram illustrating the temperature inversion based power analysis logic of FIG. 1 in accordance with one example set forth in the disclosure.

FIG. 3 is a block diagram illustrating more details of the temperature inversion based power analysis logic 102 of FIG. 1. As indicated in the figure, temperature inversion based power analysis logic 102 includes temperature inversion supply voltage determination logic 302 that receives sensed operating temperature data 116 and temperature inversion supply voltage indication 122. Temperature inversion supply voltage determination logic 302 determines that the processing unit's 106 transistors are operating in a temperature inversion range based on the supply voltage provided to the processing unit 106. For example, temperature inversion supply voltage determination logic 302 determines that the processing unit's 106 transistors are operating in a temperature inversion range if the temperature inversion based supply voltage set signal 124 is set to have supply voltage control circuitry 108 provide a supply voltage 120 below a minimum threshold supply voltage (e.g., 0.7 V).

In response to determining that the processing unit's 106 transistors are operating in a temperature inversion range, temperature inversion supply voltage determination logic 302 provides a temperature inversion based supply voltage set signal 124 to supply voltage control circuitry 108 to cause the supply voltage control circuitry 108 to adjust the supply voltage 120 to the processing unit 106. The temperature inversion based supply voltage set signal 124 is provided based an operating temperature of the processing unit 106 and on at least one temperature inversion supply voltage indication 122. The operating temperature of the processing unit 106 is obtained from the sensed operating temperature data 116. In one example, temperature inversion supply voltage determination logic 302 adjusts the supply voltage to the processing unit 106 based on a current operating temperature of the processing unit and on at least one temperature inversion supply voltage indication 122, thereby causing the processing unit's 106 transistors to operate in a temperature inversion range.

Temperature inversion supply voltage determination logic 302 provides processor operating frequency data 310, which can include the current operating frequency of processing unit 106, to temperature inversion based dynamic power calculation logic 304. Temperature inversion supply voltage determination logic 302 also provides current supply voltage data 312, which can include the current supply voltage being supplied to processing unit 106, to temperature inversion based dynamic power calculation logic 304 and to temperature inversion based leakage power calculation logic 306. Temperature inversion supply voltage determination logic 302 also provides temperature inversion based leakage power calculation logic 306 with sensed operating temperature data 116, which can include the current operating temperature of the processing unit 106.

Temperature inversion based dynamic power calculation logic 304 calculates a dynamic power, such as the dynamic power of processing unit 106, based on processor operating frequency data 310 and current supply voltage data 312. In one example, the dynamic power of processing unit 106 is calculated by multiplying a current operating frequency of processing unit 106 by the current supply voltage being supplied to processing unit 106. The dynamic power can also be calculated in other ways as in known in the art. Temperature inversion based dynamic power calculation logic 304 also provides dynamic power data 316, which can include the calculated dynamic power, to temperature inversion based cooling device control logic 308.

Temperature inversion based leakage power calculation logic 306 calculates a leakage power, such as the leakage power of processing unit 106, based on processor current supply voltage data 312 and operating temperature data 314. In one example, the leakage power of processing unit 106 is calculated by multiplying a current operating temperature of processing unit 106 by the current supply voltage being supplied to processing unit 106. The leakage power can also be calculated in other ways as in known in the art. Temperature inversion based leakage power calculation logic 306 also provides leakage power data 318, which can include the calculated leakage power, to temperature inversion based cooling device control logic 308.

Temperature inversion based cooling device control logic 308 provides cooling control signal 123 to a cooling device, such as cooling device 111, to regulate the operating temperature of a processing unit, such as processing unit 106, based on the processing unit's determined dynamic power and leakage power. For example, temperature inversion based cooling device control logic 308 can determine an optimal temperature at which a processing unit's dynamic power balances its leakage power (e.g., a minimum total dynamic and leakage power at a particular frequency level). As a result, and the processing unit's 106 overall processing power is minimized by controlling cooling control signal 123 accordingly. The optimal temperature can also be dependent on the type of processing unit, and the type of workload the processing unit is executing. For example, temperature inversion based cooling device control logic 308 can obtain processor workload activity data 118 and technology model data 114. Processor workload activity data 118 can include a type of workload currently being executed by processing unit 106. Technology model data 114 can include the type (e.g., model, package type) of processing unit 106. In one example, temperature inversion based cooling device control logic 308 determines the operating temperature of processing unit 106 to be a temperature at a particular frequency of the processor where the processor's total power, including its dynamic power and leakage power, is minimal.

Figure 4:
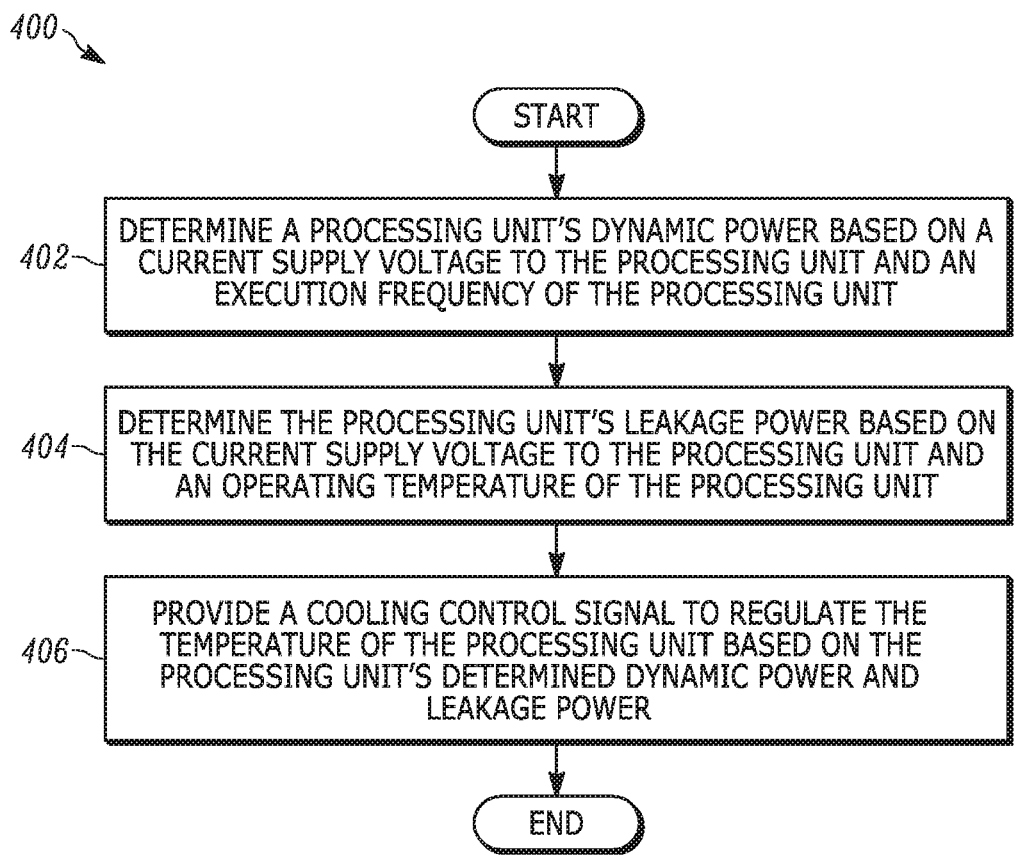
FIG. 4 is a flow chart illustrating a method for controlling the cooling of a processing unit in accordance with one example set forth in the disclosure.

FIG. 4 illustrates a flow chart of an example method 400 for providing a cooling control signal, such as cooling control signal 123, to a cooling device, such as cooling device 111, which can be performed, for example, by temperature inversion based power analysis logic 102. At step 402, a processing unit's dynamic power is determined based on a current supply voltage to the processing unit and on an operating frequency of the processing unit. At step 404, the processing unit's leakage power is determined based on a current supply voltage to the processing unit and on an operating temperature of the processing unit. At step 406, a cooling control signal is provided to regulate the temperature of the processing unit based on the determined dynamic power and leakage power for the processing unit. For example, if the calculated leakage power is more than the calculated dynamic power, the cooling control signal causes a cooling device to turn on to cool the processing unit.

FIG. 5 is a temperature inversion based VFT timing error table illustrating an example of a processing unit timing analysis at various processing unit supply voltages and operating temperatures for a given operating frequency (e.g., 350 MHz). The table shows supply voltages 502 along a Y-axis, and operating temperature ranges 504 along an X-axis. For example, column 1 of operating temperature ranges 504 includes the operating temperature range of 20 degrees Celsius up to 100 degrees Celsius. Each operating temperature range can include any range of operating temperatures, including 1 degree Celsius or part thereof. For each operating temperature range 504, there is one supply voltage 502 whereby a processing unit will experience a smallest deviation 506 (e.g., timing error) compared to when the processing unit is operating under a reference margin (e.g., a reference supply voltage such as 0.7 Volts, and reference operating temperature, such as 0 degrees Celsius), as illustrated in the table. The supply voltages 502 can be supply voltages that cause the transistors to a processing unit, such as processing unit 106, to operate in a temperature inversion region.

Figure 6:
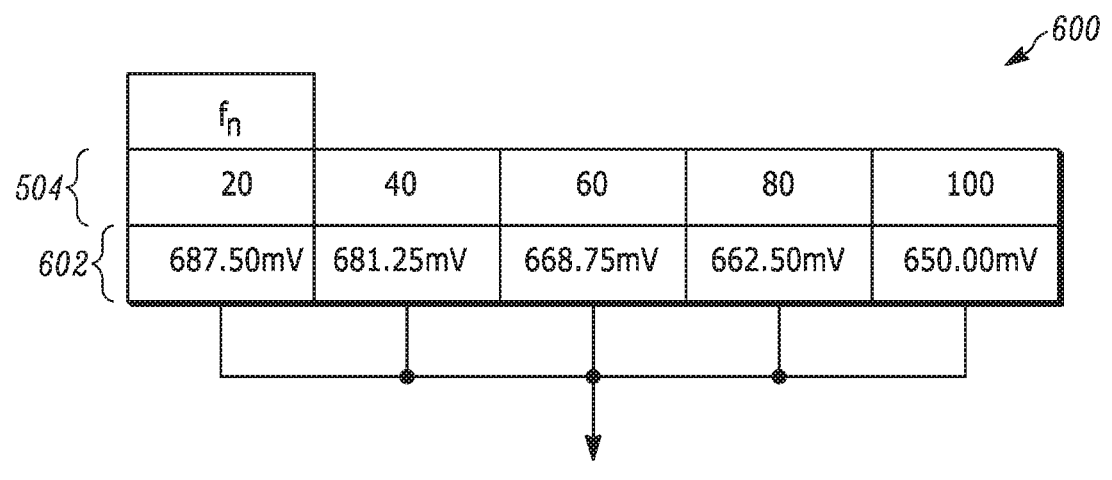

Temperature inversion based VFT data 104 can include the corresponding supply voltage 502 to each smallest deviation 506. For example, and as shown in FIG. 6, temperature inversion based VFT data 104 can be stored in memory, such as in temperature inversion based VFT lookup table 600. The temperature inversion based VFT lookup table 600, in this example, includes operating temperature ranges 504 and corresponding supply voltages 602, where each corresponding supply voltage 602 is the corresponding supply voltage 502 to each smallest deviation 506 associated with each operating temperature range 504 of FIG. 5. The supply voltages 602 are provided as one or more temperature inversion supply voltage indications 122. Although temperature inversion based VFT data 104 can include the corresponding supply voltage 502 to each smallest deviation 506, temperature inversion based VFT data 104 can include corresponding supply voltages 502 that do not correspond to each smallest deviation 506. In one example, temperature inversion based VFT data 104 includes lower supply voltages associated with increasing operating temperatures.

Figure 7:
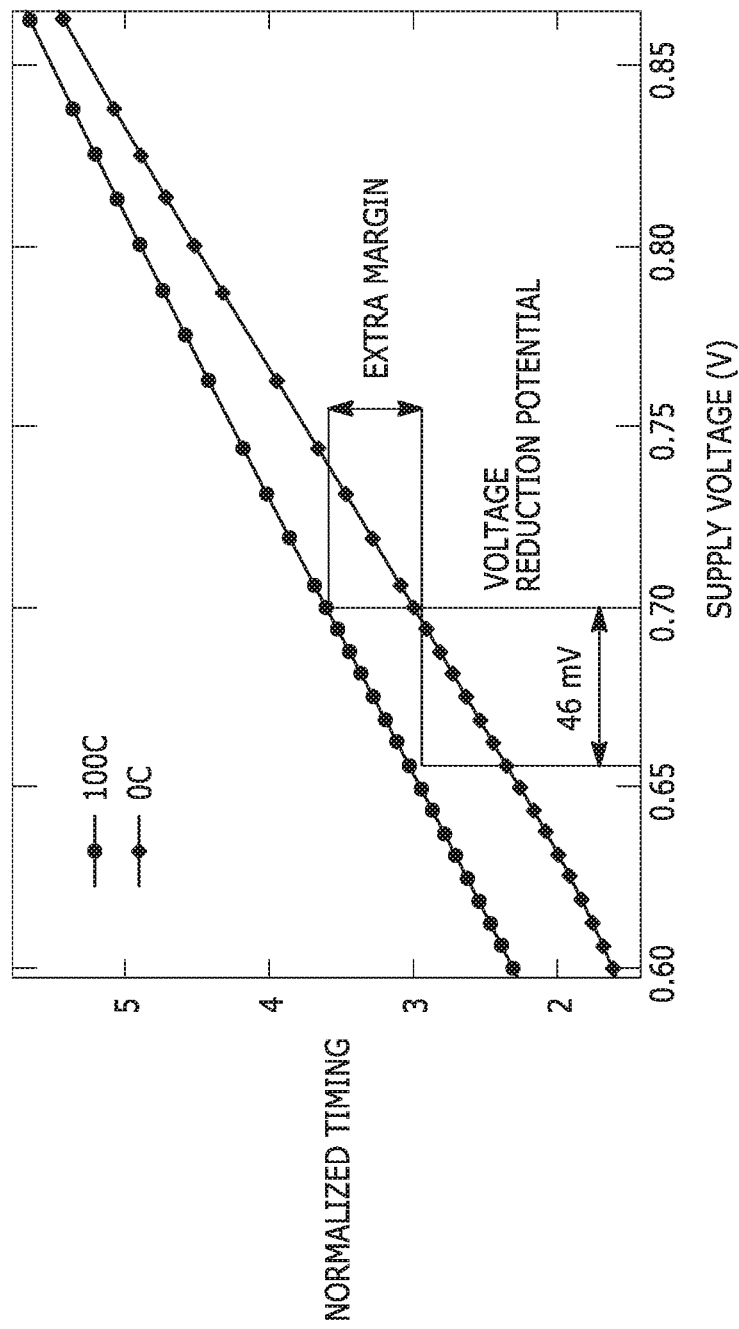
FIG. 7 is a graph illustrating a processing unit timing analysis at various supply voltages in a temperature inversion region of a processing unit in accordance with one example set forth in the disclosure.
Figure 8:
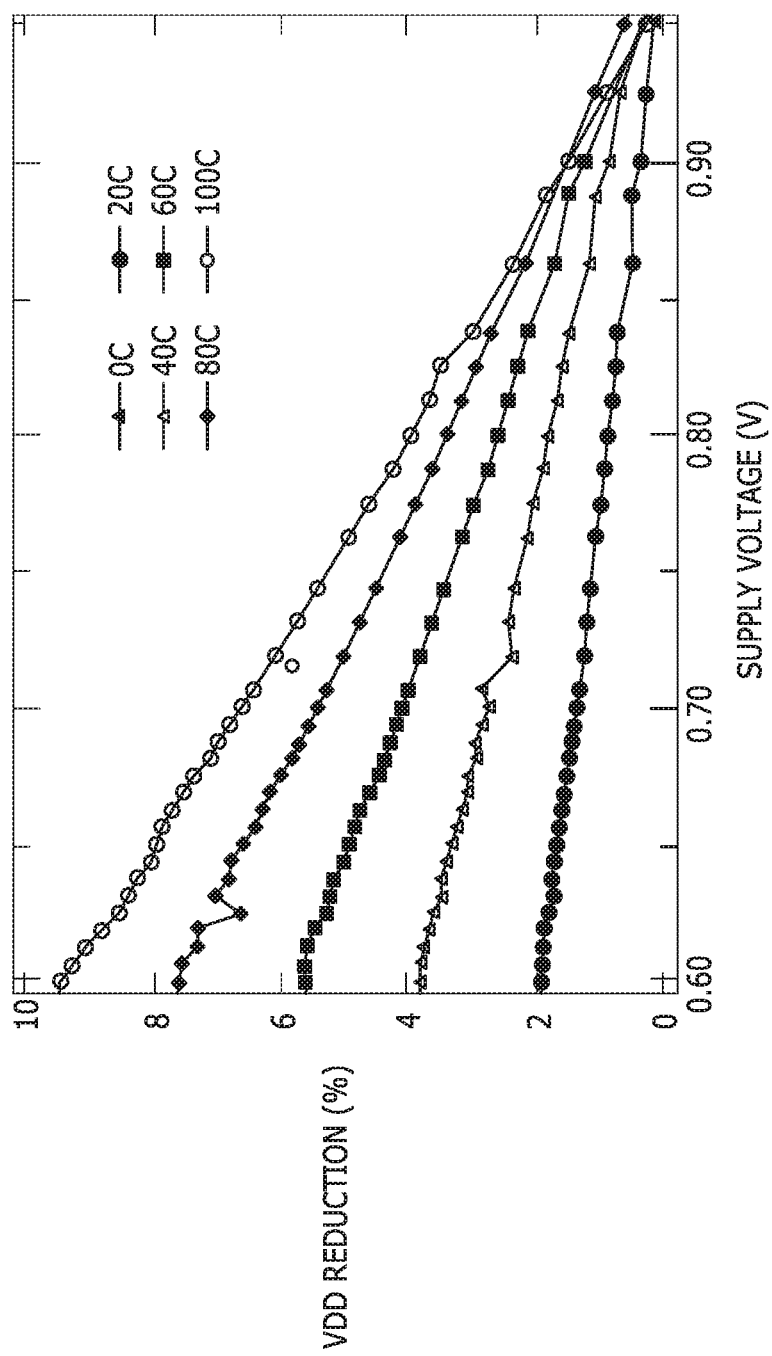
FIG. 8 is a graph illustrating a processing unit timing analysis at various supply voltages in a temperature inversion region of a processing unit operating at various temperatures in accordance with one example set forth in the disclosure.

FIGS. 7 and 8 illustrate examples of processing unit timing analysis when a processing unit is operating at various supply voltages in a temperature inversion region of the processing unit. Referring to FIG. 7, the figure shows temperature inversion's performance benefit at an operating temperature of 100 degrees Celsius over a 0 degree Celsius reference temperature baseline. As indicated in the figure, the benefit increases as the supply voltage decreases. For instance, in the illustrated example, the extra margin at 0.7 V allows for a 46 mV voltage reduction. By reducing the supply voltage to the processing unit from 0.7 V to 0.654V when the processing unit is operating at a temperature of 100 degrees Celsius, the dynamic power and leakage power of the processing unit can be reduced while allowing the processing unit to operate at the same speed the processing unit would operate at if it were operating with a supply voltage of 0.7V at a temperature of 0 degrees Celsius.

Referring to FIG. 8, estimated opportunities to reduce a supply voltage to a processing unit at various temperatures is illustrated. As the processing unit supply voltage scales down, the voltage reduction potential increases almost linearly. Temperature inversion effect is stronger in the lower voltage regions, and hence the greater timing margin opportunity. At a supply voltage of 0.6 V and operating temperature of 100 degrees Celsius, the extra timing margin provided by temperature inversion can turn into almost a 10% voltage reduction compared to when the processing unit operates under a reference supply voltage of 0.6 V and reference operating temperature of 0 degrees Celsius.

Figure 9:
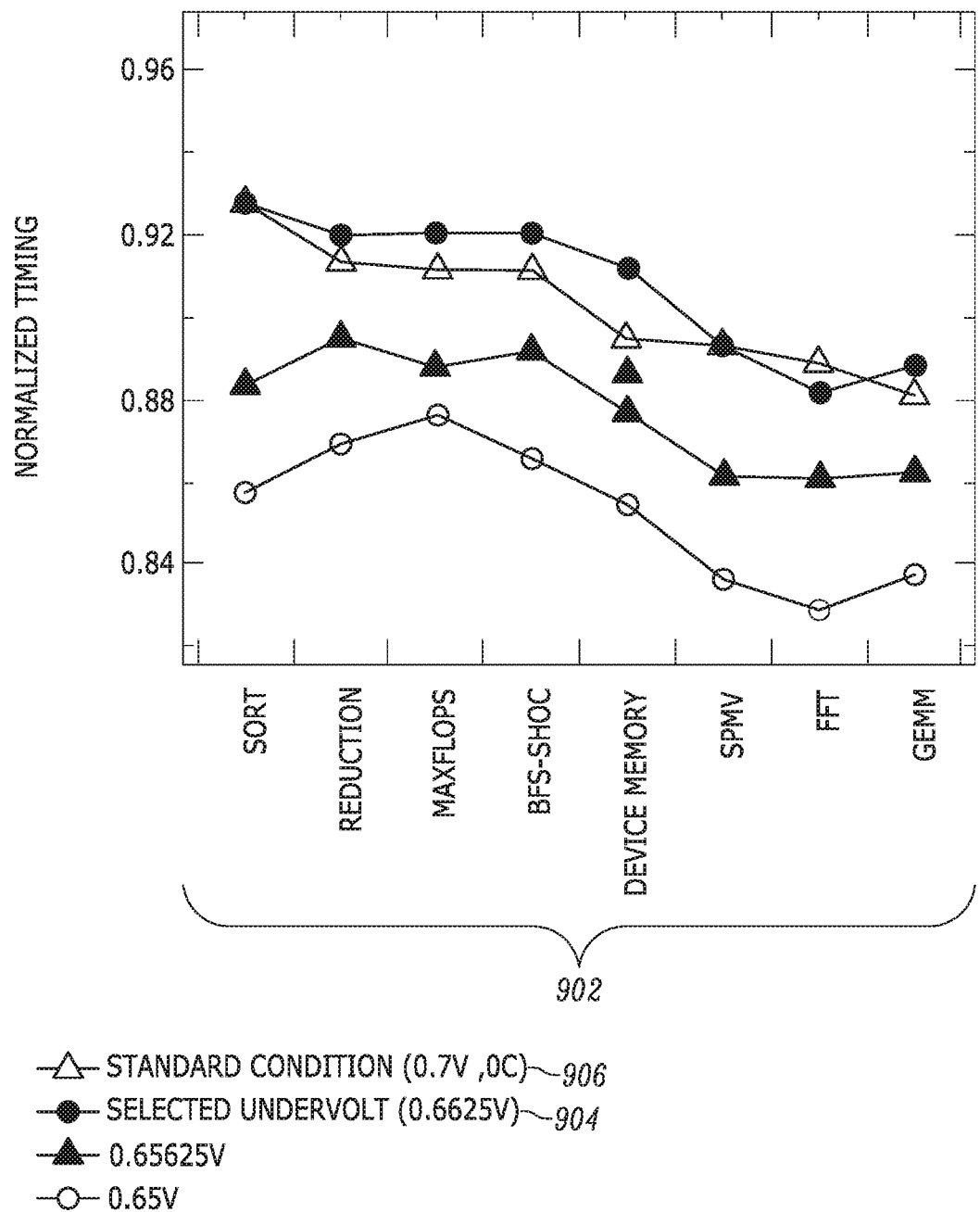
FIG. 9 is a graph illustrating a processing unit timing analysis at various supply voltages in a temperature inversion region of a processing unit in accordance with one example set forth in the disclosure.
Figure 10:
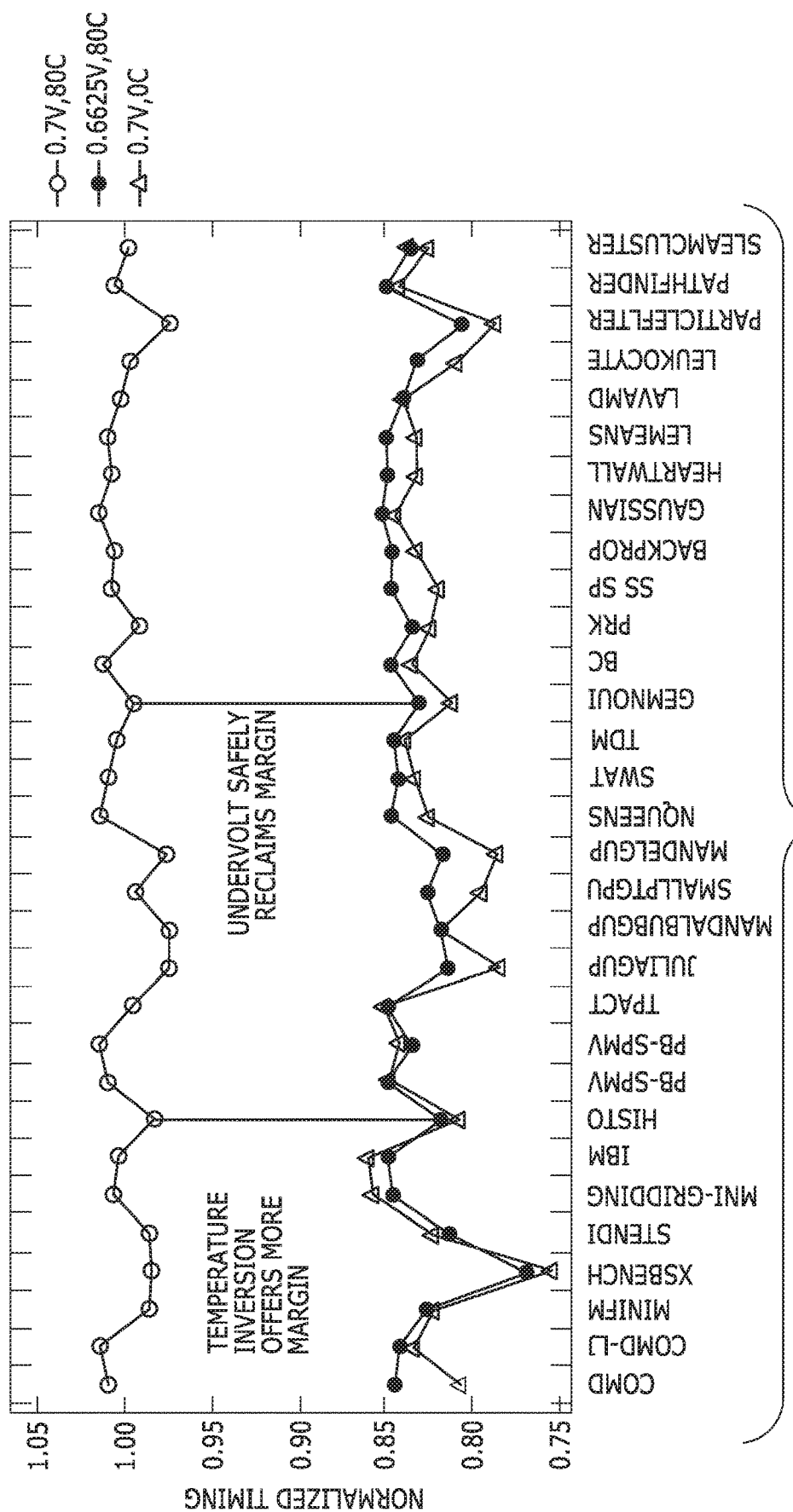
FIG. 10 is a graph illustrating a processing unit timing analysis at various supply voltages in a temperature inversion region of a processing unit in accordance with one example set forth in the disclosure.

FIGS. 9 and 10 are graphs illustrating examples of processing unit timing analysis at various supply voltages in a temperature inversion region of a processing unit. The timing analysis includes workload timing analysis where, for each differing type of workloads 902 for a processing unit operating at 80 degrees Celsius, a normalized timing margin at various processing unit supply voltages (e.g., 0.6625V, 0.65625V, and 0.65V) is indicated. The processing unit supply voltage that allows the processing unit to operate with a minimum timing (e.g., operating speed) difference compared to when the processing unit is operating at a standard condition 906 (i.e., operating under the reference supply voltage of 0.7V and at a reference operating temperature of 0 degrees Celsius) is the selected undervolt 904 supply voltage for the processing unit when the processing unit is executing the corresponding type of workload 902 at an operating temperature of 80 degrees Celsius. For example, the temperature inversion based VFT data 104 of FIG. 1 can include, for an operating temperature of 80 degrees Celsius, a corresponding supply voltage of 0.6625V. The selected undervolt 904 supply voltage can be selected among the various processing unit supply voltages based on an algorithm that measures the various workloads timing margins. One example of such an algorithm, which utilizes PSM to perform timing measurements, is shown below in Table 1.

TABLE 1

Algorithm 1 $T_i$ - state Construction Methodology

```
1:          procedure GET REFERENCE MARGIN
2:          set voltage and temperature to reference
3:              for each training workload do
4:                  workloadMargin ← PSM measurement
5:                  Push RefMarginArr, workloadMargin
6:      procedure EXPLORE UNDERVOLT
7:          initVdd ← idle PSM extrapolation
8:          candidateVddArr ← voltage around initVdd
```

TABLE 1-continued

Algorithm 1 $T_i$ - state Construction Methodology

```
 9:         minErr ← MaxInt
10:         set exploration temperature
11:         for each Vdd in candidateVddArr do
12:             set voltage to Vdd
13:             for each training workload do
14:                 workloadMargin ← PSM measurement
15:                 push TrainMarginArr, workloadMargin
16:             err ← diff(RefMarginArr, TrainMarginArr)
17:             if err < minErr then
18:                 minErr ← err
19:                 exploreVdd ← Vdd
        return exploreVdd
```

One example of the benefits to utilizing the workload timing results of Algorithm 1 shown in Table 1 to provide supply voltages for a processing unit when executing the various workloads is shown in FIG. 10. At 0.7 V, when the operating temperature of the processing unit increases from 0 degrees Celsius to 80 degrees Celsius, a more than 15% extra timing margin is made available, depending on the differing types of workloads 1002. After reducing the supply voltage to the processing unit, workload timing margins closely track the reference, as indicated in the figure, with some workloads showing slightly higher margin.

Figure 11:
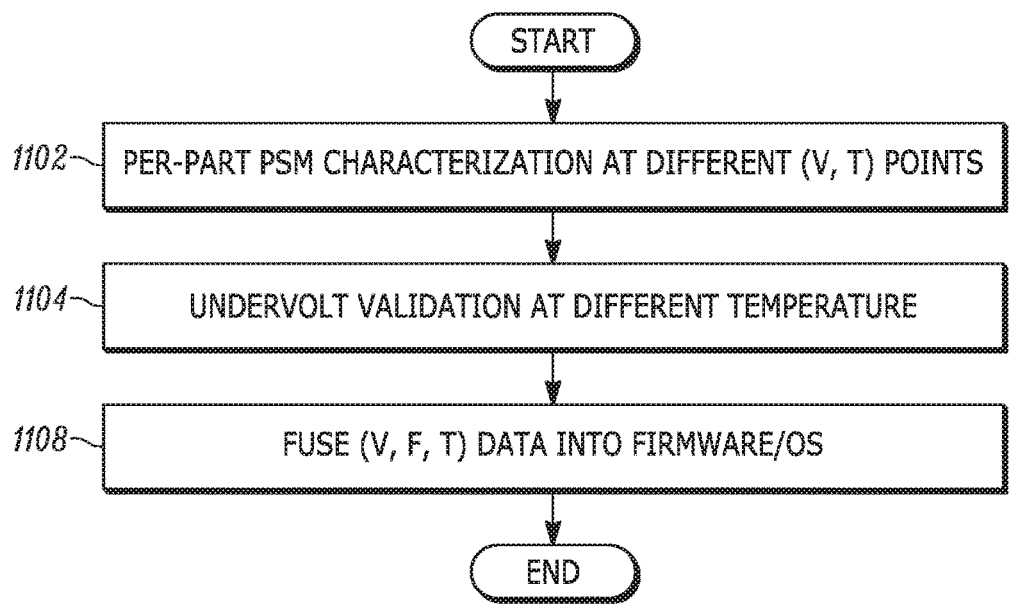
FIG. 11 is a flow chart illustrating a method for creating a temperature inversion based VFT table that includes temperature inversion based VFT data in memory in accordance with one example set forth in the disclosure.

FIG. 11 is a flow chart illustrating an example of a method for creating a temperature inversion based VFT table that includes temperature inversion based VFT data in memory. At step 1102, the operating speed behavior of a processing unit is characterized with a timing sensor, such as an on-chip PSM sensor, at various supply voltage and operating temperature points. For example, algorithm 1 of Table 1 above can be employed to characterize the processing unit's operating speed behavior. At step 1104, the characterization at various supply voltages and operating temperatures are validated. For example, for each supply voltage and corresponding temperature, the processing unit's operating speed is measured (e.g., using PSM) when executing a corresponding workload. At step 1106, temperature inversion based VFT data is fused into system firmware or an operating system. The temperature inversion based VFT data can include, for example, a supply voltage corresponding to a minimum operating speed (e.g., timing) difference between when the processing unit is operating at a particular operating temperature under the supply voltage compared to when the processing unit is operating at a reference operating temperature under a reference supply voltage. The system firmware or operating system can be executed by, for example, the temperature inversion based power analysis logic 102 of FIG. 1.

Figure 12:
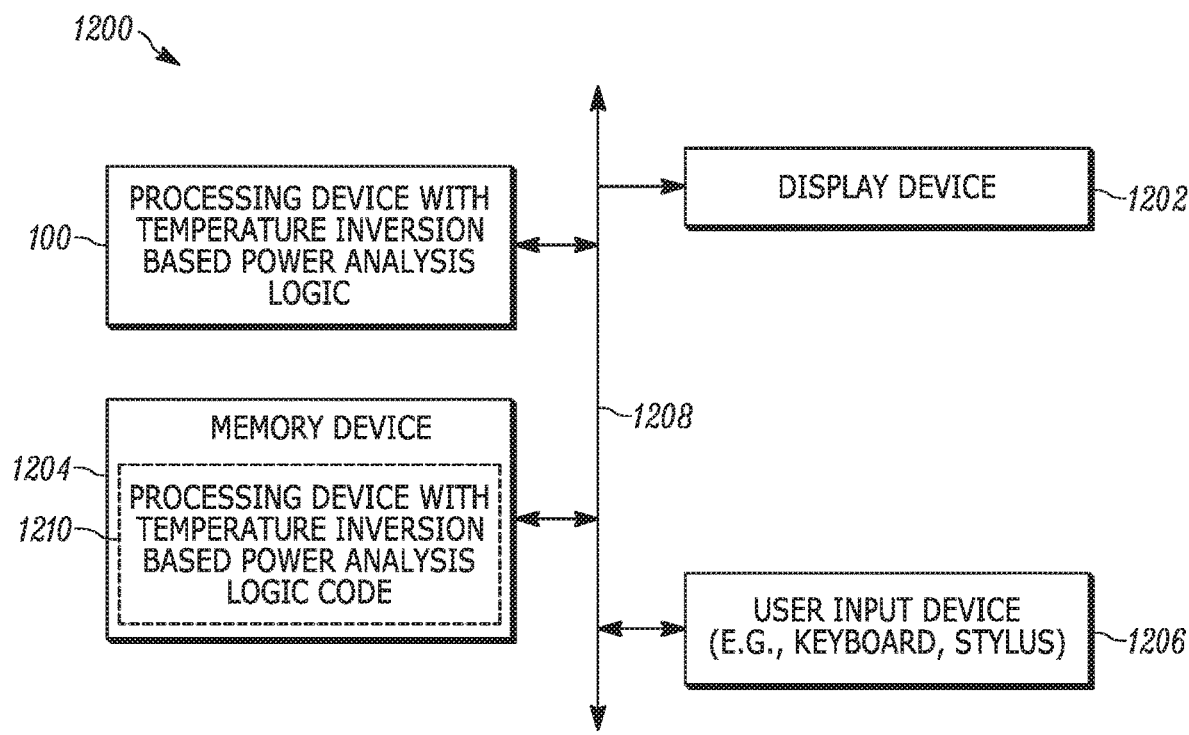
FIG. 12 is a block diagram illustrating an apparatus including the temperature inversion based power analysis logic of FIG. 1 in accordance with one example set forth the disclosure.

FIG. 12 is a block diagram of an example system 1200 that includes the apparatus 100 with temperature inversion based power analysis logic 102 of FIG. 1. As illustrated, the system 1200 also includes display device 1202, memory device 1204, and user input device 1206, all operably coupled to apparatus 100 with temperature inversion based power analysis logic via communication bus 1208. Communication bus 1208 can be any suitable communication bus employing any suitable protocol(s) to allow apparatus 100 to communicate with the various connected devices. Display device 1202 can be any suitable display, such as a touchscreen display. User input device 1206 can be a keyboard, stylus, or any other suitable user input device.

In some examples, executable suitable instructions can be stored on a non-transitory computer readable medium, where the executable instructions are executable by one or more processors to cause the one or more processors to perform the actions described herein. Referring back to FIG. 12, memory device 1204 can store executable instructions, including processing device with temperature inversion based power analysis logic code 1210, to be executed by apparatus 100 with temperature inversion based power analysis logic. Memory device 1204 can be any suitable memory, such as random access memory (RAM), non-volatile memory (e.g., read-only memory (ROM), flash memory, EPROM, EEPROM, etc.), a disk storage device, or any other suitable memory that can store executable instructions.

Some or all of this functionality can also be implemented in any other suitable manner such as, but not limited to, a software implementation including, for example, a driver implementation, a firmware implementation, a hardware implementation, or any suitable combination of the example implementations described above.

The above detailed description and the examples described therein have been presented for the purposes of illustration and description only and not for limitation. For example, the operations described can be done in any suitable manner. The methods can be performed in any suitable order while still providing the described operation and results. An apparatus includes any suitable product which includes, for example, an integrated circuit that includes the temperature inversion based power analysis logic 102 or any suitable combination of components. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method for managing processing power of a processing unit comprised of a plurality of transistors, the method comprising:
    determining, by logic, that the plurality of transistors are operating in a temperature inversion range based on a supply voltage to the processing unit; and
    adjusting, by the logic, the supply voltage to the processing unit to cause the plurality of transistors to operate in the temperature inversion range, based on an operating temperature of the processing unit and on at least one of a plurality of temperature inversion supply voltage indications obtained from temperature inversion based voltage, frequency, temperature (VFT) data, wherein each of the at least one of the plurality of temperature inversion supply voltage indications corresponds to a different supply voltage for the processing unit that causes the plurality of transistors to operate in the temperature inversion range and to a different operating temperature of the processing unit.

2. The method of claim 1 wherein adjusting the supply voltage to the processing unit comprises maintaining an operating frequency of the processing unit by reducing the supply voltage to the processing unit from a first level to a second level, wherein the second level corresponds to the at least one of the plurality of temperature inversion supply voltage indications.

3. The method claim 1 wherein adjusting the supply voltage to the processing unit comprises determining that the operating temperature of the processing unit corresponds to an operating temperature corresponding to the at least one of the plurality of temperature inversion supply voltage indications.

4. The method of claim 1 comprising:
determining that a previous operating temperature of the processing unit is closest to a first operating temperature corresponding to a first temperature inversion supply voltage indication of the at least one of the plurality of temperature inversion supply voltage indications;
determining that a current operating temperature of the processing unit is closest to a second operating temperature corresponding to a second temperature inversion supply voltage indication of the at least one of the plurality of temperature inversion supply voltage indications; and
wherein adjusting the supply voltage to the processing unit comprises:
reducing the supply voltage to the processing unit from a first supply voltage corresponding to the first temperature inversion supply voltage indication to a second supply voltage corresponding to the second temperature inversion supply voltage indication in response to determining that the current operating temperature is greater than the previous operating temperature; and
increasing the supply voltage to the processing unit from the first supply voltage corresponding to the first temperature inversion supply voltage indication to the second supply voltage corresponding to the second temperature inversion supply voltage indication in response to determining that the current operating temperature is less than the previous operating temperature.

5. The method of claim 1 wherein the at least one of the plurality of temperature inversion supply voltage indications comprise a first temperature inversion supply voltage indication and a second temperature inversion supply voltage indication, wherein the first temperature inversion supply voltage indication corresponds to a first supply voltage and a first operating temperature of the processing unit and the second temperature inversion supply voltage indication corresponds to a second supply voltage and a second operating temperature of the processing unit, wherein the first supply voltage is greater than the second supply voltage and the first operating temperature is less than the second operating temperature, wherein adjusting the supply voltage to the processing unit comprises:
determining that the operating temperature is closer to the second operating temperature of the second temperature inversion supply voltage indication than the first operating temperature of the first temperature inversion supply voltage indication; and
reducing the supply voltage to the processing unit from the first supply voltage to the second supply voltage.

6. The method of claim 1 wherein adjusting the supply voltage to the processing unit comprises reducing the supply voltage to the processing unit based on the operating temperature of the processing unit being greater than a previously received operating temperature of the processing unit.

7. The method of claim 1 wherein:
adjusting the supply voltage to the processing unit comprises obtaining the at least one of the plurality of temperature inversion supply voltage indications from a temperature inversion based VFT table; and
each of the plurality of the temperature inversion supply voltage indications of the temperature inversion based VFT table comprises lower supply voltages and corresponding higher temperatures.

8. The method of claim 1 comprising:
determining the processing unit's dynamic power based on a current supply voltage of the processing unit and an operating frequency of the processing unit;
determining the processing unit's leakage power based on the current supply voltage of the processing unit and the operating temperature of the processing unit; and
providing a cooling control signal to a cooling device to regulate the operating temperature of the processing unit based on the processing unit's determined dynamic power and leakage power.

9. An apparatus for managing processing unit power comprising:
a processing unit comprised of a plurality of transistors; and
temperature inversion based power analysis logic operatively coupled to the processing unit and operative to:
determine that the plurality of transistors are operating in a temperature inversion range based on a supply voltage to the processing unit; and
provide a supply voltage set signal to adjust the supply voltage to the processing unit to cause the plurality of transistors to operate in the temperature inversion range, based on an operating temperature of the processing unit and on at least one of a plurality of temperature inversion supply voltage indications obtained from temperature inversion based voltage, frequency, temperature (VFT) data, wherein each of the at least one of the plurality of temperature inversion supply voltage indications corresponds to a different supply voltage for the processing unit that causes the plurality of transistors to operate in the temperature inversion range and to a different operating temperature of the processing unit.

10. The apparatus of claim 9 wherein the temperature inversion based power analysis logic is operative to maintain an operating frequency of the processing unit by providing the temperature inversion based supply voltage set signal to reduce the supply voltage to the processing unit from a first level to a second level wherein the second level corresponds to the at least one of the plurality of temperature inversion supply voltage indications.

11. The apparatus of claim 9 wherein the temperature inversion based power analysis logic is operative to determine that the operating temperature of the processing unit corresponds to an operating temperature corresponding to the at least one of the plurality of temperature inversion supply voltage indications.

12. The apparatus of claim 9 wherein the temperature inversion based power analysis logic is operative to:
determine that a previous operating temperature of the processing unit is closest to a first operating temperature corresponding to a first temperature inversion supply voltage indication of the at least one of the plurality of temperature inversion supply voltage indications;
determine that a current operating temperature of the processing unit is closest to a second operating temperature corresponding to a second temperature inversion supply voltage indication of the at least one of the plurality of temperature inversion supply voltage indications;
in response to determining that the current operating temperature is greater than the previous operating temperature, provide the temperature inversion based supply voltage set signal to reduce the supply voltage to processing unit from a first supply voltage corresponding to the first temperature inversion supply voltage indication to a second supply voltage corresponding to the second temperature inversion supply voltage indication; and in response to determining that the current operating temperature is less than the previous operating temperature, provide the temperature inversion based supply voltage set signal to increase the supply voltage to processing unit from the first supply voltage corresponding to the first temperature inversion supply voltage indication to the second supply voltage corresponding to the second temperature inversion supply voltage indication.

13. The apparatus of claim 9 wherein the at least one of the plurality of temperature inversion supply voltage indications comprise a first temperature inversion supply voltage indication and a second temperature inversion supply voltage indication, wherein the first temperature inversion supply voltage indication corresponds to a first supply voltage and a first operating temperature of the processing unit and the second temperature inversion supply voltage indication corresponds to a second supply voltage and a second operating temperature of the processing unit, wherein the first supply voltage is greater than the second supply voltage and the first operating temperature is less than the second operating temperature, wherein the temperature inversion based power analysis logic is operative to:

determine that the operating temperature is closer to the second operating temperature of the second temperature inversion supply voltage indication than the first operating temperature of the first temperature inversion supply voltage indication; and provide the temperature inversion based supply voltage set signal to reduce the supply voltage to the processing unit from the first supply voltage to the second supply voltage.

14. The apparatus of claim 9 wherein the temperature inversion based power analysis logic is operative to provide the temperature inversion based supply voltage set signal to reduce the supply voltage to the processing unit based on the operating temperature of the processing unit being greater than a previously received operating temperature of the processing unit.

15. The apparatus of claim 9, further comprising:
a memory operably coupled to the temperature inversion based power analysis logic, wherein:
the memory stores a temperature inversion based VFT table,
the temperature inversion based power analysis logic is operative to obtain the at least one of the plurality of temperature inversion supply voltage indications from the temperature inversion based VFT table, and
each of the plurality of the temperature inversion supply voltage indications of the temperature inversion based VFT table comprises lower supply voltages and corresponding higher temperatures.

16. The apparatus of claim 9, further comprising:
a cooling device operably coupled to the temperature inversion based power analysis logic, wherein the temperature inversion based power analysis logic is operative to:
determine the processing unit's dynamic power based on a current supply voltage of the processing unit and an operating frequency of the processing unit;
determine the processing unit's leakage power based on the current supply voltage of the processing unit and the operating temperature of the processing unit; and
provide a cooling control signal to the cooling device to regulate the operating temperature of the processing unit based on the processing unit's determined dynamic power and leakage power.

17. An apparatus for managing processing unit power comprising:
a processing unit comprised of a plurality of transistors;
an operating temperature sensor operably coupled to the processing unit and operative to obtain an operating temperature of the processing unit;
supply voltage control circuitry operably coupled to the processing unit and operative to adjust the supply voltage to the processing unit;
a memory storing a temperature inversion based voltage, frequency, temperature (VFT) table comprising at least one temperature inversion supply voltage indication, wherein each of the at least one temperature inversion supply voltage indication corresponds to a different supply voltage for the processing unit that causes the plurality of transistors to operate in a temperature inversion range and to a different operating temperature of the processing unit; and
temperature inversion based power analysis logic operatively coupled to the processing unit, to the supply voltage control circuitry, and to the memory, and operative to:
determine that the plurality of transistors are operating in the temperature inversion range based on a supply voltage to the processing unit;
obtain sensed operating temperature data corresponding to an operating temperature of the processing unit from the operating temperature sensor; and
in response to determining that the plurality of transistors are operating in the temperature inversion range, provide a temperature inversion based supply voltage set signal to the supply voltage control circuitry to cause the supply voltage control circuitry to adjust the supply voltage to the processing unit to cause the plurality of transistors to operate in the temperature inversion range, based on the obtained operating temperature of the processing unit and on the at least one temperature inversion supply voltage indication from the temperature inversion based voltage, frequency, temperature (VFT) table.

18. A non-transitory computer readable medium comprising executable instructions that when executed by one or more processors cause the one or more processors to:
determine that a plurality of transistors of a processing unit are operating in a temperature inversion range based on a supply voltage to the processing unit; and
provide a temperature inversion based supply voltage set signal to adjust the supply voltage to the processing unit to cause the plurality of transistors to operate in the temperature inversion range, based on an operating temperature of the processing unit and on at least one of a plurality of temperature inversion supply voltage indications obtained from temperature inversion based voltage, frequency, temperature (VFT) data, wherein each of the at least one of the plurality of temperature inversion supply voltage indications corresponds to a different supply voltage for the processing unit that causes the plurality of transistors to operate in the temperature inversion range and to a different operating temperature of the processing unit.

19. The non-transitory computer readable medium of claim 18 wherein the executable instructions cause the one or more processors to maintain an operating frequency of the processing unit by providing the temperature inversion based supply voltage set signal to reduce the supply voltage to the processing unit from a first level to a second level wherein the second level corresponds to the at least one of the plurality of temperature inversion supply voltage indications.

20. The non-transitory computer readable medium of claim 18 wherein the executable instructions cause the one or more processors to determine that the operating temperature of the processing unit corresponds to an operating temperature corresponding to the at least one of the plurality of temperature inversion supply voltage indications.

21. The non-transitory computer readable medium of claim 18 wherein the executable instructions cause the one or more processors to:
  determine that a previous operating temperature of the processing unit is closest to a first operating temperature corresponding to a first temperature inversion supply voltage indication of the at least one of the plurality of temperature inversion supply voltage indications;
  determine that a current operating temperature of the processing unit is closest to a second operating temperature corresponding to a second temperature inversion supply voltage indication of the at least one of the plurality of temperature inversion supply voltage indications;
  in response to determining that the current operating temperature is greater than the previous operating temperature, provide the temperature inversion based supply voltage set signal to reduce the supply voltage to the processing unit from a first supply voltage corresponding to the first temperature inversion supply voltage indication to a second supply voltage corresponding to the second temperature inversion supply voltage indication; and
  in response to determining that the current operating temperature is less than the previous operating temperature, provide the temperature inversion based supply voltage set signal to increase the supply voltage to the processing unit from the first supply voltage corresponding to the first temperature inversion supply voltage indication to the second supply voltage corresponding to the second temperature inversion supply voltage indication.

22. The non-transitory computer readable medium of claim 18 wherein the at least one of the plurality of temperature inversion supply voltage indications comprise a first temperature inversion supply voltage indication and a second temperature inversion supply voltage indication, wherein the first temperature inversion supply voltage indication corresponds to a first supply voltage and a first operating temperature of the processing unit and the second temperature inversion supply voltage indication corresponds to a second supply voltage and a second operating temperature of the processing unit, wherein the first supply voltage is greater than the second supply voltage and the first operating temperature is less than the second operating temperature, wherein the executable instructions cause the one or more processors to:
  determine that the operating temperature is closer to the second operating temperature of the second temperature inversion supply voltage indication than the first operating temperature of the first temperature inversion supply voltage indication; and
  provide the temperature inversion based supply voltage set signal to reduce the supply voltage to the processing unit from the first supply voltage to the second supply voltage.

23. The non-transitory computer readable medium of claim 18 wherein the executable instructions cause the one or more processors to provide the temperature inversion based supply voltage set signal to reduce the supply voltage to the processing unit based on the operating temperature of the processing unit being greater than a previously received operating temperature of the processing unit.

24. The non-transitory computer readable medium of claim 18 wherein the executable instructions cause the one or more processors to obtain the at least one of the plurality of temperature inversion supply voltage indications from a memory storing a temperature inversion based VFT table, and wherein each of the plurality of the temperature inversion supply voltage indications of the temperature inversion based VFT table comprises lower supply voltages and corresponding higher temperatures.

25. The non-transitory computer readable medium of claim 18 wherein the executable instructions cause the one or more processors to:
  determine the processing unit's dynamic power based on a current supply voltage of the processing unit and an operating frequency of the processing unit;
  determine the processing unit's leakage power based on the current supply voltage of the processing unit and the operating temperature of the processing unit; and
  provide a cooling control signal to a cooling device to regulate the operating temperature of the processing unit based on the processing unit's determined dynamic power and leakage power.

* * * * *